United States Patent [19]

Naegele et al.

[11] Patent Number: 4,895,020

[45] Date of Patent: Jan. 23, 1990

[54] AIR FLOW RATE METER FOR INTERNAL COMBUSTION ENGINES

[75] Inventors: Erwin Naegele, Hessigheim; Armin Witzig, Renningen, both of Fed. Rep. of Germany

[73] Assignee: Robert Bosch GmbH, Stuttgart, Fed. Rep. of Germany

[21] Appl. No.: 304,139

[22] Filed: Jan. 31, 1989

[30] Foreign Application Priority Data

Mar. 4, 1988 [DE] Fed. Rep. of Germany ....... 3807049

[51] Int. Cl.[4] ............................................. G01M 15/00
[52] U.S. Cl. ................................................... 73/118.2
[58] Field of Search ............................ 73/118.1, 118.2; 116/266–268, 270, 271, 273, 274, 291, 292, 312–315; 194/248; 74/532–534, 540, 541; 292/253; 403/326, 327

[56] References Cited

U.S. PATENT DOCUMENTS

| | | | |
|---|---|---|---|
| 3,648,541 | 3/1972 | Hybarger et al. | 74/540 |
| 4,149,494 | 4/1979 | Wolfinger et al. | |
| 4,593,577 | 6/1986 | Kinoshita | 74/541 |

FOREIGN PATENT DOCUMENTS 2544791 4/1977 Fed. Rep. of Germany .

Primary Examiner—Robert R. Raevis
Attorney, Agent, or Firm—Edwin E. Greigg

[57] ABSTRACT

In known air flow rate meters, the initial tension of a spiral spring, which generates the restoring force on the baffle valve, is adjusted by the snapping of a locking spring into gaps between the teeth of a tooth ring provided on the spring housing. However, the tooth spacing cannot be made arbitrarily small. Accordingly, a way to enable finer adjustment of the initial tension is needed, so that a measurement can be made even at low idling speeds and with a small aspirated air quantity. In the air flow rate member according to the invention, the locking spring engages a detent element, which facing the toothed ring has an inside serration, the spacing of the teeth of which is less than the spacing of the toothed ring; when the spring housing rotates, detent increments that correspond to the spacing of the inside serration are attainable. Quite generally, the embodiment according to the invention enables sensitive adjustment and locking of a spiral spring serving as a restoring force.

3 Claims, 3 Drawing Sheets

AIR FLOW RATE METER FOR INTERNAL COMBUSTION ENGINES

BACKGROUND OF THE INVENTION

The invention is based on an air flow rate meter as defined hereinafter. In a known air flow rate meter (German Offenlegungsschrift No. 25 44 791), adjustment of the spring force of the spiral spring, which is done by rotating the spring housing and snapping the locking spring into the toothed ring of the spring housing, cannot be done sufficiently precisely. Because lower and lower engine idling speeds are currently being required, the air flow rate meter must respond increasingly precisely to ever-smaller quantities of aspirated air, which necessitates particularly precise adjustment of the basic tension of the spiral spring of the air flow rate meter.

OBJECT AND SUMMARY OF THE INVENTION

The air flow rate meter according to the invention has the advantage over the prior art that in a simple manner, it enables more-precise adjustment of the basic setting for the spiral spring force, which increases the precision of the air flow rate meter even at minimal aspirated air quantities in the idling range of the engine.

Decreasing the spacing of the teeth of the inside serration of the detent element by a multiple number relative to the spacing of the toothed ring is particularly advantageous, because this assures that the tips of the teeth of the toothed ring will be aimed at the bottom or root of a gap between the teeth in the inside serration of the detent element and will snap securely into place there.

For securing the axial position of the spring housing on the detent element, it is also advantageous to provide a retaining step that laps over the spring housing.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
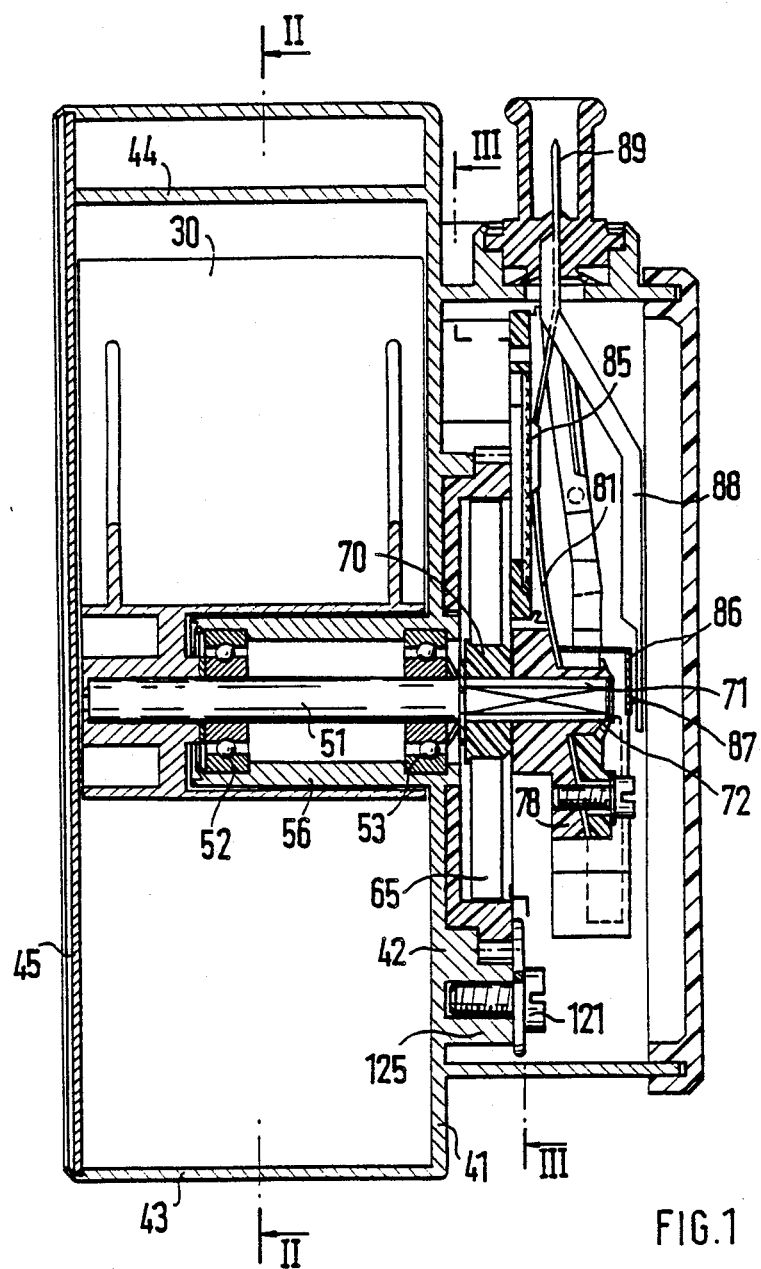
FIG. 1 is a section taken through an air flow rate meter.
Figure 2:
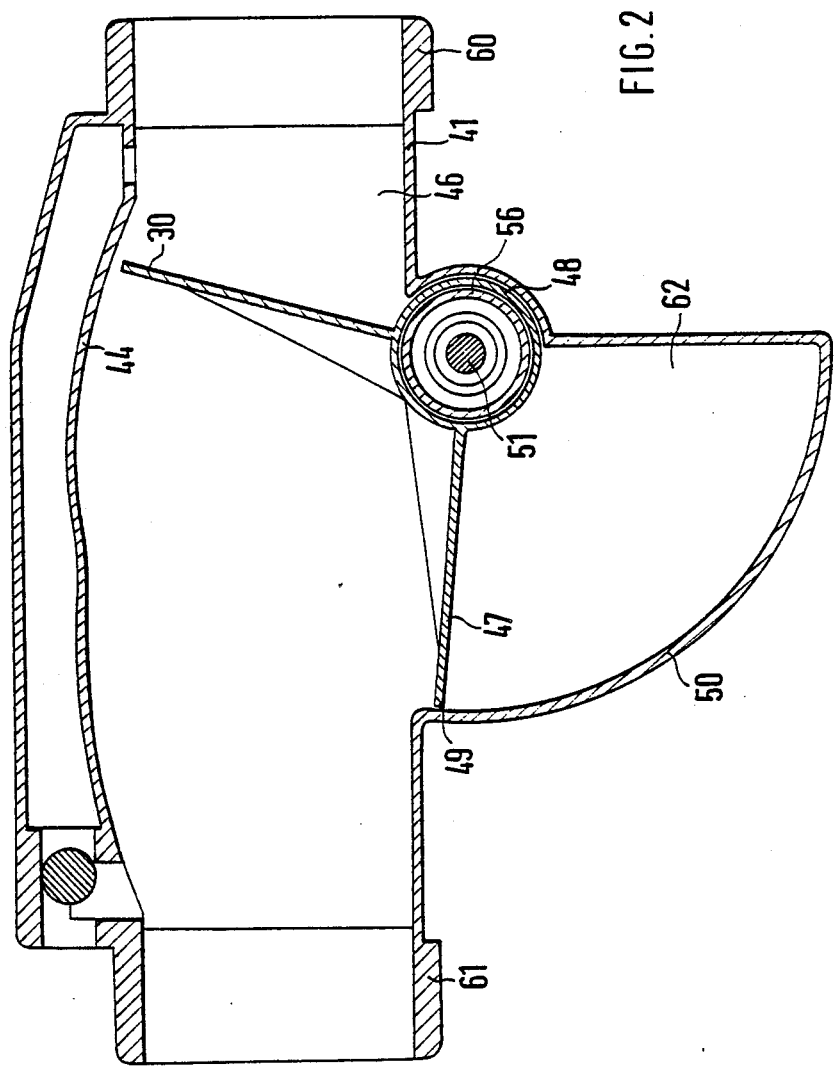
FIG. 2 is a section taken along the line II—II of FIG. 1.
Figure 3:
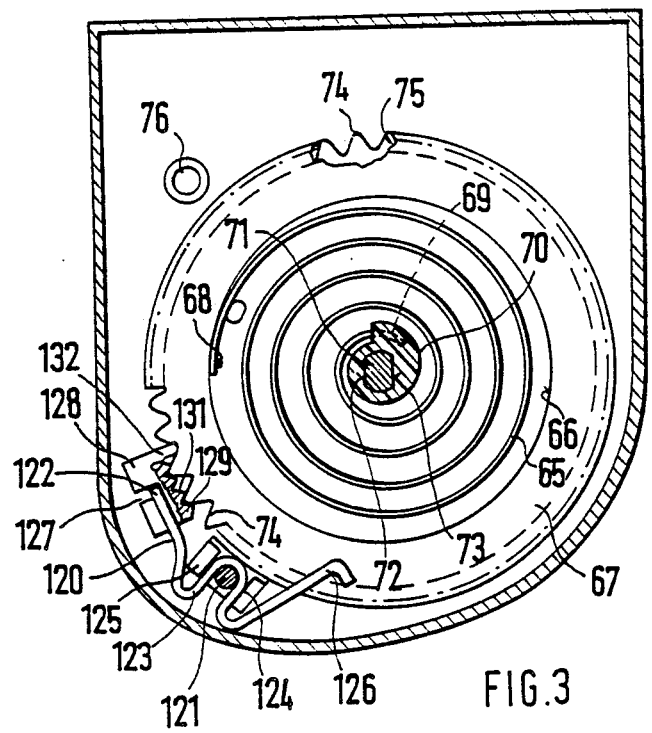
FIG. 3 is a section taken along the line III—III of FIG. 1.

The air flow rate meter shown as an example in FIGS. 1-3, for measuring the air aspirated by internal combustion engines, has a housing 41, for example of die-cast zinc, having a central bottom plate 42 with formed-on side walls 43 and 44, which together with an inserted die-case zinc lid 45 form a rectangular measurement conduit 46 and a damping chamber 62. A rectangular baffle valve 30 is disposed in the measurement conduit 46 and is integrally joined to a damping vane 47, which is offset by approximately 100° in the flow direction and has a hub 48. For supporting the baffle valve 30 and its damping vane 47 with as little friction and play as possible, for the sake of accuracy in air flow measurement, and to attain equal damping action in all the pivoted positions of the damping vane at the air gap 49 prevailing between the free end edge of the damping vane 47 and the chamber wall 50 embodied as a sector of a cylinder, the hub is supported on one side with the aid of a shaft 51 firmly mounted in it and carrying two ball bearings 52 and 53 spaced apart from one another. The hub 48, which is reinforced with ribs with respect to the baffle valve 30 and damping vane 47, includes a hollow space over approximately ⅔ of its axial length; a collar 56 cast onto the bottom plate 42 and receiving the two outer races of the ball bearings 52 and 53 protrudes into this hollow space.

In the exemplary embodiment shown, the measurement conduit 46, which is of rectangular cross section, is used as part of the air intake tube leading from an air filter to the various intake tube connections of the cylinders, and for this purpose can be connected by a flange 60, cast onto it at the front, with the segment of the air intake tube extending from the air filter. A downstream connection flange 61 makes it possible to connect the measurement conduit 46 with a segment of the intake tube that contains a throttle valve. In the pivoting range of the baffle valve 30, the upper limiting wall 44 of the measurement conduit 46 is embodied such that the through cross section for the aspirated air widens exponentially with increasing deflection of the baffle valve 30, which takes place counterclockwise as seen in FIG. 2.

The pivoting motion of the baffle valve 30 and damping vane 47 takes place counter to the practically constant force of a spiral spring 65, one end segment of which is secured with a rivet 68 in a central recess 66 of a plastic spring housing 67. The other end segment 69 of the spiral spring 65 is embedded in the lobe of a cam 70, likewise made of plastic, in such a way that it exits from the cam at virtually a right angle and therefore at the point of exit forms an unchanged long lever arm with respect to the axis of rotation of the shaft 51, which protrudes with its free end segment 71 past the bottom plate 42 and there has two flattened portions 72 and 73 facing one another, which lend the required form-fitting engagement with the cam 70. The spring housing 67 has a formed-on toothed ring 75 with pointed teeth 74. A pinion (not shown) that can be inserted with its journal into a bore 76 can engage this toothed ring and can be used to rotate the spring housing 67 sensitively, until a prescribed value for the initial spring tension is attained. For fixation of the position of the spring housing 67 and hence of the initial tension of the spiral spring 65, a locking spring 120 is used, which by means of a chucking screw 121 on one end is secured to the air flow rate meter housing and the free end 122 of which is bent in such a way that it engages the inside of an opening 127 in a detent element 128 and exerts a spring force upon the detent element in the radial direction toward the toothed ring 75. The locking spring 120 is preferably made of round steel wire and has a U-shaped chucking loop 123, which is retained by the chucking screw 121 in a groove 124 of a chucking extension 125 on the air flow rate meter housing. For positional fixation of the spring housing 67 with respect to the housing of the air flow rate meter, the locking spring 120 is connected, symmetrically with the chucking point 121, 123, and with an off-standing terminal end of spring 126 that laps over the spring housing 67. The detent element 128 has, facing the toothed ring 75 of the spring housing 67 and meshing therewith, a curved inside serration 129, with teeth 131 that have a reduced spacing relative to the teeth 74 of the toothed ring 75. Preferably the spacing of the teeth 131 of the inside serration 129 of the detent element 128 is reduced integrally, that is, by a multiple number, with respect to the spacing of the teeth 74 of the toothed ring 75, so that the tips of the teeth 74 of the toothed ring 75 each extend toward the base or root of a gap between the teeth 131 of the inside serration 129 and more than one of the teeth 74 will engage more than one such gap. For axial positional securing of the spring housing 67, the detent element 128 has a retaining step 132 that laps over the spring housing 67.

The teeth 74 of the toothed ring 75 and the teeth 131 of the inside serration 129 are shaped such that rotation of the toothed ring 75 is possible, if a torque of sufficient magnitude is brought to bear by the insertable pinion.

Beside the cam 70 of the spiral spring 65 on the free end portion 71 of the shaft 51 is a wiper carrier 78 (FIG. 1), likewise pressed from plastic. Mounted on the wipe carrier is a wiper spring 81 which serves as a pickup of a potentiometer and is adapted to rest on a circular-arc resistor path of a potentiometer chip 85. A tongue 86 is placed against the wiper spring 81. A pressure contact 87 is mounted on the free end of this tongue 86, disposed in the extension of the axis of rotation of the shaft 51, and therefore virtually frictionlessly makes the electrical connection of the wiper spring 81 with a contact arm 88, which terminates in a plug tongue 89, by way of which, along with other plug tongues, not shown, electrical connection with evaluation circuits can be effected.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. An air flow rate meter for internal combustion engines that includes an air flow intake tube through which air is aspirated, having a baffle plate provided with a shaft disposed in the air intake tube of the engine substantially transversely to the aspirated air flow direction, said baffle plate being adjustable counter to a spring force, a hub connected to said baffle plate and supported at one end in an air flow rate meter housing associated with said air flow intake tube, a spiral spring associated with said shaft adapted to generate a force for the baffle plate, said spiral spring having inner and outer end portions, the outer end portion of said spring being secured in a recess of a spring housing provided with a toothed ring (75) on its circumference, the spring housing further adapted to be rotatably supported coaxially with said shaft and lockable after adjustment of an initial spring tension, by means of a locking spring (120) includes an end (122) which engages a detent element (128), that is oriented toward the toothed ring (75) of the spring housing (67) and provided with an inside serration (129), said inside serration having teeth of reduced spacing by comparison with the spacing of the toothed ring (75) which teeth on said inside serration when pressed by the force of the locking spring (120), engages the toothed ring (75).

2. An air flow rate meter as defined by claim 1, in which the detent element (128), for axial positional securing of the spring housing (67), has a retaining step (132) which laps over the spring housing (67).

3. An air flow rate meter as defined by claim 1, in which the spacing of the inside serration (129) of the detent element (128) is reduced by a multiple number relative to the spacing of the toothed ring (75).

* * * * *